United States Patent

[11] 3,589,781

| [72] | Inventors | William G. Hanley<br>R.R. No. 4, Newark, Ohio 43055;<br>Frank H. Fisher, R.R. No. 1, Kenton, Ohio 43326 |
|---|---|---|
| [21] | Appl. No. | 846,092 |
| [22] | Filed | July 30, 1969 |
| [45] | Patented | June 29, 1971<br>Division of Ser. No. 820,680, April 30, 1969, Pat. No. 3,497,275, continuation of Ser. No. 558,755, June 20, 1966, abandoned. |

[54] BRAKE CAMSHAFT MOUNTING
14 Claims, 4 Drawing Figs.

| [52] | U.S. Cl. | 308/36.1, 308/72 |
|---|---|---|
| [51] | Int. Cl. | F16c 1/24, F16c 9/06 |
| [50] | Field of Search | 308/36.1, 29, 72 |

[56] References Cited
UNITED STATES PATENTS

| 2,675,279 | 4/1954 | Heim | 308/72 |
|---|---|---|---|
| 2,892,662 | 6/1959 | Scheel | 308/36.1 |
| 2,886,379 | 5/1959 | Small | 308/72 |
| 3,076,683 | 2/1963 | Hanley | 308/36.1 |
| 3,383,129 | 5/1968 | Ulderup | 308/72 |

*Primary Examiner*—Milton Kaufman
*Assistant Examiner*—Wesley S. Ratliff, Jr.
*Attorneys*—John R. Bronaugh, George R. Powers and Floyd S. Levison ABSTRACT: A brake camshaft assembly including a shaft and a pair of axially spaced-apart bushings rotatably supporting the shaft, one of the bushings having a cylindrical outer surface rotatably received in a first retainer secured in a fixed position relative to a first support member and the other bushing having a spherical outer surface rotatably received within a second retainer secured to a second support member in a normally fixed position, the normally fixed position of the second retainer being selectively adjustably relative to the second support member to permit proper axial alignment of the bushings for free rotation of the shaft.

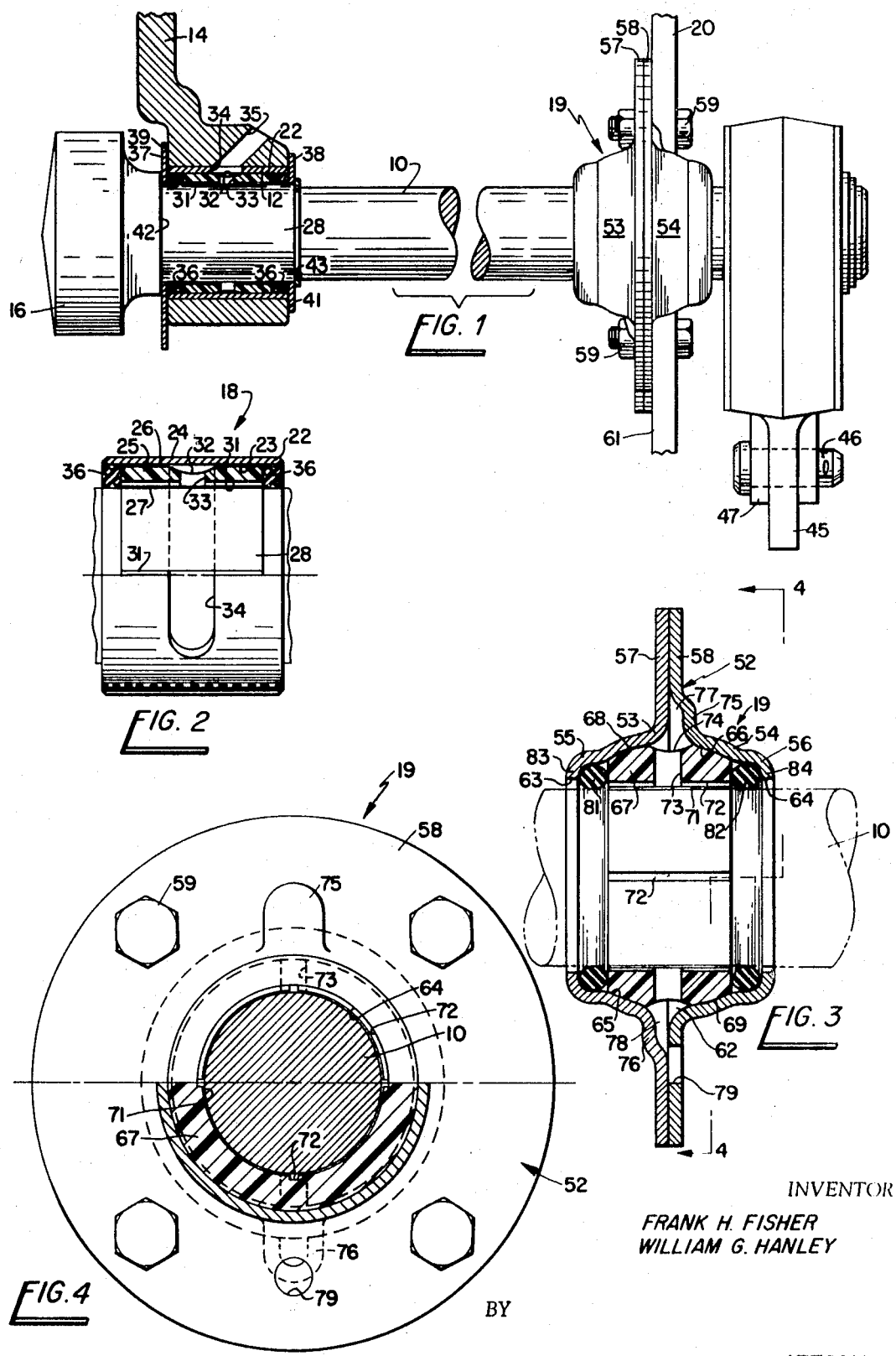

BRAKE CAMSHAFT MOUNTING

This application is a division of patent application Ser. No. 820,680 for Method of Making A Friction Welded Drive Axle Shaft Having An Annular Section of Flash Metal, filed on Apr. 30, 1969, now U.S. Pat. No. 3,497,275 by the applicants of this application and assigned to the assignee of this application. Application Ser. No. 820,680 is a continuation of application Ser. No. 558,755, now abandoned, filed on June 20, 1966.

This invention refers to improvements in camshaft mounting for vehicle wheel brake actuating mechanism and is particularly concerned with improvements in the bearing arrangements in the assembly.

In many mechanical automotive brakes, the actuating cam and the camshaft are usually formed into a rigid or integral unit supported on suitable bearings disposed adjacent opposite ends of the camshaft. In known brakes the camshaft is journaled in bearings disposed respectively in an opening in the axle mounted brake support plate or spider at the inner end of the camshaft adjacent the cam, and in a bracket rigidly attached to a nonrotatable part of the vehicle at the outer end of the camshaft such as an axle housing mounted bracket.

The type of brake assembly to which the invention applies is disclosed in Buckendale U.S. Pat. No. 2,331,652 issued Oct. 12, 1942, wherein antifriction bearings are employed in the camshaft supports. However, antifriction bearings have now been largely replaced in such assemblies by plain bushings and by certain types of nonmetallic plastic bearings such as disclosed in Scheel U.S. Pat. No. 2,892,662 issued June 30, 1959 and Hanley U.S. Pat. No. 3,076,683 issued Feb. 5, 1963.

Plastic bushings of the type shown in the Scheel patent made from nylon, tetrafluoroethylene or similar synthetic materials have come into widespread use because of their corrosion resistant characteristics, wear resistance, and low friction and self-lubricating properties.

Difficulties have been encountered using synthetic plastic materials for such camshaft bearings which in certain instances may nullify their otherwise excellent bearing characteristics. One of these disadvantages is hydroscopic instability whereby the substance may absorb a high percentage of moisture causing severe dimensional changes affecting brake operation. This is particularly true of some nylons.

Another more pronounced disadvantage is the high coefficient of thermal expansion of some of these synthetic plastic materials which may be as high as approximately 10 times that of the camshaft steel, which may result in bearing seizure during operational conditions wherein the temperature is raised as by internal friction or external sources.

Another undesirable characteristic inherent in some of these tough, wear resistant plastic materials is the cold flow property by which it deforms under load. This condition requires large clearance in the bearing supports which in turn makes it difficult to retain the bearings in the supports and maintain efficient seals.

In addition, in brake structures such as disclosed in the aforementioned prior art patents, the opening in the brake support or spider which receives the inner camshaft bearing had to be counterbored at both ends to receive suitable end seal assemblies or end sealing formations of the bearing bushings. This counterboring step must be a precise machining operation to assure concentricity with the aperture and provide close fitting seats for the bearing seals, which is time consuming and expensive.

The present invention provides an improved brake camshaft bearing arrangement employing self-contained synthetic plastic bushings of adequate quality at both ends of the shaft and including a mounting eliminating expensive and tedious counterboring operations at the brake mechanism support or spider, and it is a major object of the invention to accomplish the foregoing.

In the preferred embodiment of the invention, at the inner end of the camshaft the bearing assembly comprises a metal retainer sleeve press fitted into a brake spider opening to receive a suitable plastic bushing journaling the camshaft. This bushing is shorter than the metal sleeve and of a slightly less outer diameter than the inner diameter of the metal sleeve, displacement inner diameter of the bushing is slightly larger than the diameter of the camshaft, to enable the bushing to freely rotate either on the shaft or within the metal sleeve to thus reduce friction. At both ends of the metal sleeve, adjacent the ends of the bushing, compression seals are incorporated between the metal sleeve and the shaft to seal in lubricant and prevent the entry of foreign matter such as dust and moisture.

At the outer end of the camshaft, the bearing assembly of the invention comprises a sheet metal retainer socket suitably secured to a nonrotatable part of the vehicle such as an axle housing bracket, which retainer contains a plastic-type bushing in which the camshaft rotates. This bushing has a spherical seat in the retainer socket to allow universal angular displacement of the camshaft during brake application and to compensate for any misalignment during assembly between the brake support camshaft opening and the axle bracket. The openings of the bushing retainer are sealed by suitable compression seals adjacent the ends of the bushing.

It is therefore the further object of this invention to provide novel bearing arrangements for mounting the inner and outer ends of a brake-actuating camshaft embodying special synthetic plastic bushing and retainer arrangements and constructions.

It is another object of the invention to provide a brake camshaft bearing assembly comprising a sheet metal retainer enclosing a synthetic plastic bushing that is relatively rotatable with respect to the camshaft, and wherein end seals carried by the retainer protectively enclose the bushing ends.

Other novel features and objects of the invention will become apparent by reference to the following detailed description in connection with the appended drawings in which:

FIG. 1 is a fragmentary side elevation partly in cross section showing a brake cam and camshaft assembly according to a preferred embodiment of the invention;

FIG. 2 is an enlarged fragmentary side elevation showing the spider mounted bearing assembly with the upper part of the bushing arrangement in section;

FIG. 3 is an enlarged elevation showing the self-contained bearing assembly at the outer end of the camshaft of FIG. 1; and FIG. 4 is an end view in section substantially along line 4—4 of FIG. 3.

With particular reference to FIG. 1 there is illustrated part of a mechanical brake-actuating mechanism comprising a steel camshaft 10 which at its inner left end extends through an opening 12 formed within a nonrotatable steel brake support or spider 14 which may be suitably secured to the axle housing as disclosed in said Buckendale patent. The inner end of the camshaft 10 is integrally formed into a cam 16 of any known configuration adapted to displace the brakeshoes (not shown) outwardly against the brakedrum (not shown) upon rotation of the camshaft 10.

Camshaft 10 is rotatably supported at its inner end within the spider opening 12 in a bearing assembly 18, to be described in detail. Camshaft 10 is rotatably supported at its outer end in a bearing assembly 19 suitably mounted upon a bracket 20 affixed to the axle housing (not shown) as in the manner disclosed in said Buckendale and Scheel patents.

FIGS. 1 and 2 show bearing assembly 18 as a self-contained unit comprising a hardened metal cylindrical sleeve 22 having a length equal to the axial length of the opening 12, and an outer diameter substantially corresponding to the inner diameter of the opening 12 which is machined to provide a smooth uninterrupted cylindrical surface sized to allow sleeve 22 to be press fitted nonrotatably therein, so that after assembly sleeve 22 completely rigidly lines aperture 12 from end to end. Inner surface 23 and outer surface 24 of sleeve 22 are concentric smooth cylinders.

The inner surface 23 of sleeve 22 is preferably ground and polished smooth to provide a bearing surface surrounding a plain cylindrical bushing 25 of synthetic plastic material which is axially shorter than sleeve 22. The outer smooth cylindrical surface 26 of bushing 25 is slightly smaller in diameter than the inner surface 23 of the sleeve to allow the bushing to rotate with respect to the sleeve.

The smooth cylindrical inner surface 27 of bushing 25 is adapted to rotatively surround the smooth ground cylindrical inner bearing surface 28 of the camshaft, and shaft surface 28 is of slightly smaller diameter than bushing surface 27 to allow the shaft to freely rotate therein and to prevent seizing of the bushing on the shaft. Thus when the camshaft 10 is rotated to actuate the brake it either rotates freely within bushing 25 or bushing 25 is rotated with the shaft within sleeve 22. By this arrangement, in combination with the herein later described specific material of the bushing, seizing of the bushing on the shaft or in sleeve 22 is effectively prevented even when lubrication fails and localized bushing wear is eliminated.

The inner surface 27 of bushing 25 is provided with a number of axial shallow grooves 31 extending from end to end, and the outer surface of the bushing has a centrally located outwardly concave groove 32 extending circumferentially all around the bushing. Groove 32 is communication with internal surface 27 and grooves 31 by spaced radial apertures 33 molded in the wall of the bushing. Groove 32 is disposed in radial alignment with a circumferentially extending slot 34 in sleeve 22 which in turn is in communication with bore 35 formed in spider 14 for introduction of lubricant into the bushing assembly. Slot 34 extends about 90° around sleeve 25. A suitable oil or grease fitting may be applied to the outer end of bore 35.

Bushing 25 is axially retained centrally of sleeve 22 by oppositely located compression seals 36 which may be commercially available "quad" rings of rubber or like resilient material that are nonrotatably frictionally retained within sleeve 22 at the outer ends thereof and in the assembly are under radial compression between sleeve 22 and shaft surface 28. Seals 36 effectively seal both outer and inner peripheral surfaces of bushing 25 to retain lubricant and prevent the entry of dust, water and like foreign matter into the bushing assembly.

Bearing assembly 18 is retained within the spider aperture and prevented from axial movement relative to sleeve 22 by flat annular retaining rings 37 and 38 abutting flush against the flat parallel surfaces 39 and 41 of spider 14 surrounding opening 12. Ring 37 is axially disposed between surface 39 and the flat axial face 42 of the camshaft, and ring 38 is axially disposed between surface 41 and a snapring 43 axially fixed in a groove in the camshaft. Rings 37 and 38 are free to rotate with respect to the camshaft and the spider surfaces, and besides maintaining the bearing assembly 18 within opening 12 they also help maintain seals 36 axially within the bearing assembly.

It has been found that bushing 25 may advantageously be an integral molded composite unit consisting essentially of nylon containing distributed glass fibers and molybdenum disulfide. One type found practical is that sold under the trade name Nylafil which is a hard tough reenforced nylon composition containing about 30 percent glass fibers and about 5 percent molybdenum disulfide. This material has been found to be substantially free of dimensional changes as well as highly resistant to thermal expansion, cold flow, and moisture absorption, so that the bushing dimensions remain remarkably stable during operational conditions.

The outer end of the camshaft 10 is rotatively supported in the self-contained bearing assembly 19 shown in detail in FIGS. 3 and 4. Shaft 10 extends through bearing assembly 19 to be secured to a conventional slack adjuster lever 45 which is pivotally connected at 46 to the pushrod 57 of a fluid pressure motor (not shown) on the axle housing whereby camshaft 10 may be rotated in a well-known manner, such as disclosed in said Buckendale and Scheel patents.

Bearing assembly 19 comprises a retainer housing 52 composed of two substantially identical but reversely arranged stamped steel dish-shaped plates 53 and 54 which have central axially oppositely projecting body portions 55 and 56, the inner open ends of which are surrounded by flat annular flanges 57 and 58 that in the assembled position coextensively abut and are secured together as by bolt and nut assemblies 59 to form a peripherally closed retainer housing. The bolt and nut assemblies 59 also may attach flanges 57 and 58 to a support bracket arm 61 which is usually welded or similarly rigidly secured to the axle housing, as shown in said Scheel patent. Thus retainer housing 52 is fixedly mounted upon the axle housing in longitudinally spaced relation to opening 12 of the spider 14.

The body portions 53 and 54 of housing 52 extend away from each other to thus form a cavity 62 and the housing 52 is provided with axially aligned end openings 63 and 64 through which camshaft 10 freely extends. Within cavity 62 internal annular body surfaces 65 and 66 are formed to lie in a common spherical envelope symmetrical about the axis of shaft 10. An integral bushing 67 has corresponding spherical surfaces 68 and 69 seated in body surfaces 65 and 66, so that bushing 67 is mounted for universal rocking within housing 52.

Bushing 67 is annular with a smooth cylindrical bore 71 formed with a number of relatively shallow lubricant grooves 72 extending from end to end. Bushing bore 61 is of slightly larger diameter than the surface of camshaft 10, to allow the camshaft to freely rotate therein without seizing. In a preferred embodiment bushing 67 may be composed of about 65 percent of an acetal copolymer of formaldehyde base on trioxane, known commercially for example as Celcon, about 30 percent fiberglass and 5 percent tetrafluoroethylene which has proved to possess excellent properties for molding and eliminating any shrinking condition in the spherical diameter.

Grooves 72 are in communication with radial apertures 73 in the bushing wall of the bushing that opens in to an outwardly concave circumferential central groove 74 on the spherical outer surface of the bushing. Groove 74 is open to cavity 62.

The retainer housing plates are formed with oppositely disposed protrusions 75 and 76 which partly extend into the respective flanges as shown in FIG. 3, and these protrusions form in conjunction with bushing groove 74 interconnected internal lubricant-retaining pockets 77 and 78 by which the inner and outer surfaces of bushing 67 are supplied with lubricant that may be introduced through an aperture 79 in either retainer plate opposite one of the protrusions. Usually aperture 79 aligns with a bore in bracket 61 having the usual grease fitting or plug.

In order to retain the lubricant within bearing assembly 19 and to prevent the entry of foreign matter, compression seals such as resilient rubber or like O-rings 81 and 82 are provided within housing 52 on the opposite sides of bushing 67 which is axially shorter than cavity 62. Seal rings 81 and 82 are nonrotatably retained in the housing 52 by annular crimped-over end lips 83 and 84 of the housing plates at openings 63 and 64.

The spherical surface seating of bushing 67 compensates for any slight radial misalignment between the two shaft bearing positions. The spider opening 12 is usually formed before the spider is welded to the axle, and likewise the bolt holes in the outer end mounting bracket arm 61 are formed before the bracket is welded to the axle housing. Thus it is extremely difficult, if not impossible as a practical matter, to obtain exact coaxial alignment between the inner and outer spaced bearing positions. During assembly of the camshaft and supports, bolts 59 at the bearing assembly 19 are initially kept loose in the oversized holes in the outer end mounting bracket arm 61 so that the retainer housing halves can be moved to a position in which the spherical socket seating arrangement of the bushing 67 provides perfect shaft alignment. Then bolts 59 are tightened to securely clamp the housing 52 in position and thus retain the camshaft in its aligned position.

Thus, at each end of the camshaft 10, the invention provides an integral bushing of hard, tough, dimensionally stable plastic in a special retainer. These bearing arrangements utilize stable plastics that are highly resistant to creep and undesirable flexure, and the retainers and mounts cooperate therewith so as to eliminate the need for expensive machine work, such as precision counterboring of the spider opening, while at the same time providing for adequate efficient lubrication. Spider wear due to loose or worn plastic bushings is eliminated, so that spider servicing or replacement problems are eliminated. Maintenance is reduced and safety is increased.

The present invention may be embodied in other forms without departing from the essential characteristic and spirit thereof, therefore, the present embodiments are to be considered in all respects as illustrative only and not restrictive, the scope of the invention being indicated by the appended claims rather than by the foregoing description.

We claim:

1. A brake camshaft bearing assembly comprising:

an annular retainer of highly wear resistant material having axially spaced-apart end portions defining coaxial openings and two internal surfaces; intermediate said end openings of at least partially spherical form, an annular bushing of hard, tough dimensionally stable plastic material having two outer surfaces of at least partially spherical form received within said retainer for universal rocking movement relative thereto and an inner surface of generally cylindrical form, said bushing being axially shorter than said retainer and being axially centrally positioned within said retainer such that said retainer extends axially beyond the ends of said bushing, a shaft rotatably mounted within said bushing, and resilient annular seal elements mounted within the ends of said retainer at opposite ends of said bushing for sealing engagement with both said retainer and said shaft.

2. A brake camshaft bearing assembly as defined by claim 1 further comprising means for introducing lubricant through said retainer and said bushing axially intermediate said seal elements to provide lubrication of the mating surfaces of said retainer, said bushing and said shaft.

3. A brake camshaft bearing assembly as defined by claim 2 wherein said retainer is of hardened steel.

4. A brake camshaft bearing assembly as defined by claim 2 wherein said end seals are resilient rings nonrotatably mounted in said retainer and having inner boundaries adapted to compressively engage the relatively rotatable surface of said shaft.

5. A brake camshaft bearing assembly as defined by claim 1 wherein said bushing is formed on its inner boundary with at least one surface groove extending from end to end and is formed on its outer boundary with an annular groove axially intermediate its ends, at least one radial passage extending between said grooves, and passage means in said retainer communicating with said annular groove, whereby lubricant may be introduced through said passages and said grooves to provide lubrication of the mating surfaces of said retainer, said bushing and said shaft.

6. A brake camshaft bearing assembly as defined by claim 1 in which said annular retainer comprises: a pair of annular portions abutting each other on a plane normal to the axis of said end openings and containing the centers of said spherical surfaces, and means holding said retainer portions in abutting relationship.

7. A brake camshaft bearing assembly as defined by claim 6 in which the abutting section of each of said retainer portions is an annular flange radially disposed relative to the axis of said end openings, said flanges defining aligned sets of openings and said holding means comprising bolts extending axially through and substantially filling said openings to maintain said retainer portions in proper relative positions to define said internal spherical surface.

8. A brake camshaft assembly comprising:

a first rigid support member having a bore extending therethrough, a first annular retainer of highly wear-resistant material nonrotatably lining said bore, the internal diameter of said retainer being cylindrical, a first annular bushing of hard, tough dimensionally stable plastic material rotatably mounted within said first retainer, a shaft rotatably mounted within said first bushing at a first cylindrical bearing surface on said shaft, said shaft having a second cylindrical bearing surface axially spaced from said first bearing surface, a second annular retainer of highly wear-resistant material having an internal surface of spherical configuration, a second annular bushing of hard, tough dimensionally stable plastic material having an outer surface of spherical configuration received within said second retainer for universal rocking movement relative thereto, said shaft rotatably mounted within said second bushing at said second cylindrical bearing surface, a second rigid support member adjacent said second retainer, and means rigidly securing said second retainer to said second support member in a relative position in which said first and second bushings are axially aligned to permit free rotation of said shaft, each of said first and second bushings being axially shorter than the respective retainer, said assembly further comprising:

resilient annular seal elements mounted within the ends of said retainers at opposite ends of said bushings for sealing engagement with both said shaft and the respective retainers for preventing leakage of lubricant, and means for introducing lubricant through said retainers and the respective bushings axially intermediate each set of seal elements to provide lubrication of the mating surfaces of said retainers, said bushings and said shaft.

9. A brake camshaft assembly as defined by claim 8 wherein said first and second retainers are of hardened steel.

10. A brake camshaft assembly as defined by claim 8 wherein each of said first and second bushings is formed on its inner boundary with at least one surface groove extending from end to end and is formed on its outer boundary with an annular groove axially intermediate its ends, at least one radial passage extending between said grooves, and wherein passage means is provided in each of said first and second retainers communicating with the annular groove of the respective bushing for supplying lubricant thereto.

11. A brake camshaft assembly as defined by claim 8 in which said second annular retainer comprises: a pair of annular portions abutting each other on a plane substantially normal to the axis of said first and second bushings and containing the centers of said spherical surfaces, said means rigidly securing said second retainer to said second support member also holding said retainer portions in abutting relationship.

12. A brake camshaft assembly as defined by claim 11 in which the abutting section of each of said retainer portions is an annular flange substantially radially disposed relative to the axis of said first and second bushings and in which said second support member includes a flange abutting one of said retainer flanges, said retainer flanges and said support flanges having aligned sets of openings therein, and said means rigidly securing said second retainer to said second support member comprising bolt means extending axially through said sets of opening to clamp said retainer portions and said support flange rigidly together, said bolt means substantially filling the openings in said retainer flanges to maintain said retainer portions in proper relative positions to define said internal spherical surface and being substantially smaller than the openings in said support flange to permit said second retainer to be radially shifted with respect to said second support member when said bolt means is loosened so as to permit proper alignment of said first and second bushings.

13. A brake camshaft assembly as defined by claim 12 in which each of said first and second bushings is axially shorter than the respective retainer; said assembly further comprising: resilient annular seal elements mounted within the ends of said retainers at opposite ends of said bushings for sealing engagement with both said shaft and the respective retainers for preventing leakage of lubricant, anD means for introducing lubricant through said retainers and the respective bushings axially intermediate each set of seal elements to provide lubrication of the mating surfaces of said retainers, said bushings and said shaft.

14. A brake camshaft assembly as defined by claim 13 wherein each of said first and second bushings is formed on its inner boundary with at least one surface groove extending from end to end and is formed on its outer boundary with an annular groove axially intermediate its ends, at least one radial passage extending between said grooves, and wherein passage means is provided in each of said first and second retainers communicating with the annular groove of the respective bushing for supplying lubricant thereto.

PO-1050
(5/69)

UNITED STATES PATENT OFFICE
CERTIFICATE OF CORRECTION

Patent No. 3,589,781          Dated   June 29, 1971

Inventor(s)  Wm. G. Hanley and Frank H. Fisher

It is certified that error appears in the above-identified patent and that said Letters Patent are hereby corrected as shown below:

> In the Abstract, line 9, change "adjustably" to read "adjustable".
>
> Column 2, line 5, delete "displacement" and substitute therefor ---and the---;
>
> Column 2, line 44, after "elevation" insert ---in section---.
>
> Column 3, line 24, after "is" insert ---in---;
>
> Column 3, line 70, change the numeral "57" to the numeral "47".
>
> Column 4, line 25, change the numeral "61" to the numeral "71".
>
> Signed and sealed this 11th day of January 1972.

(SEAL)
Attest:

EDWARD M. FLETCHER, JR.          ROBERT GOTTSCHALK
Attesting Officer                Acting Commissioner of Patents